Figure 4C:
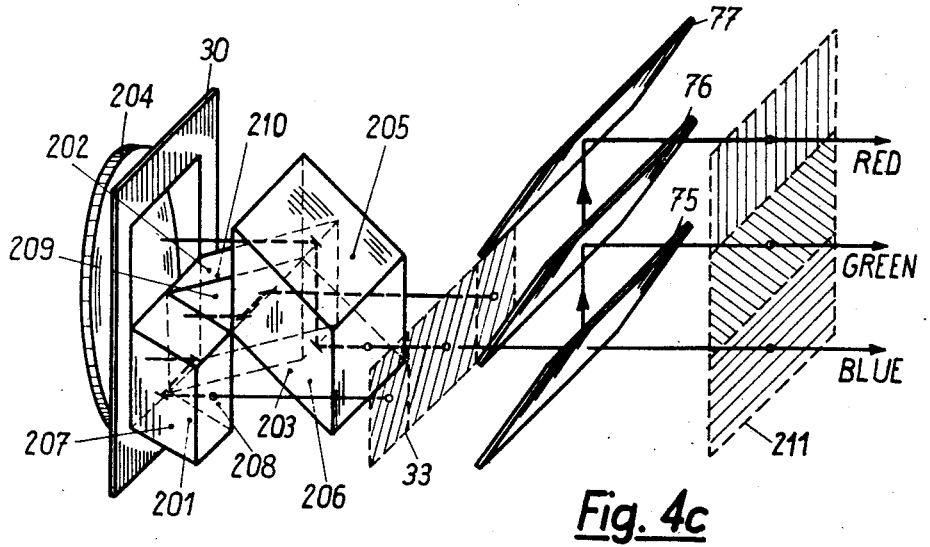

July 29, 1952  E. GRETENER  2,604,813
PROJECTION LAMP ILLUMINATION SYSTEM FOR LENTICULATED FILM
Filed March 24, 1950  3 Sheets-Sheet 1
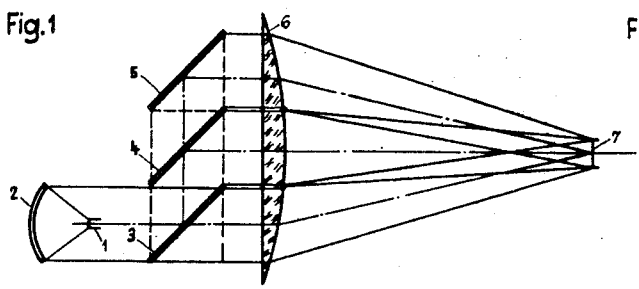
Fig.1
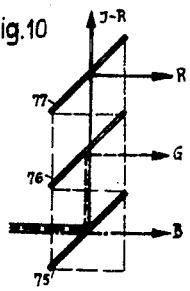
Fig.10
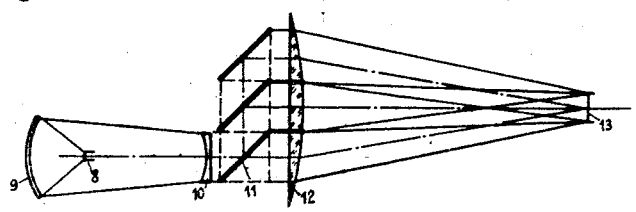
Fig.2
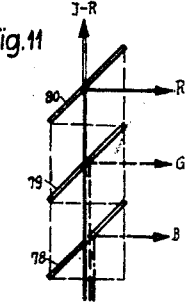
Fig.11
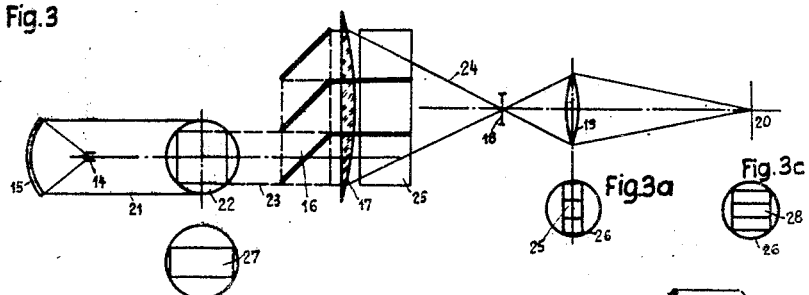
Fig.3
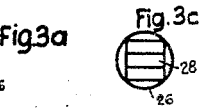
Fig.3a  Fig.3c
Fig.3b
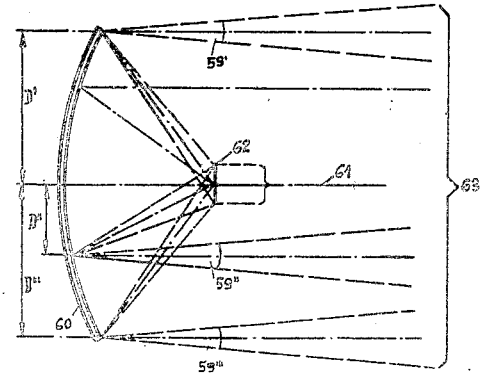
Fig.7
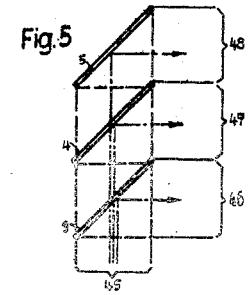
Fig.5
INVENTOR
Edgar Gretener
BY Pierce, Scheffler & Parker
ATTORNEY July 29, 1952 E. GRETENER 2,604,813
PROJECTION LAMP ILLUMINATION SYSTEM FOR LENTICULATED FILM
Filed March 24, 1950 3 Sheets-Sheet 2
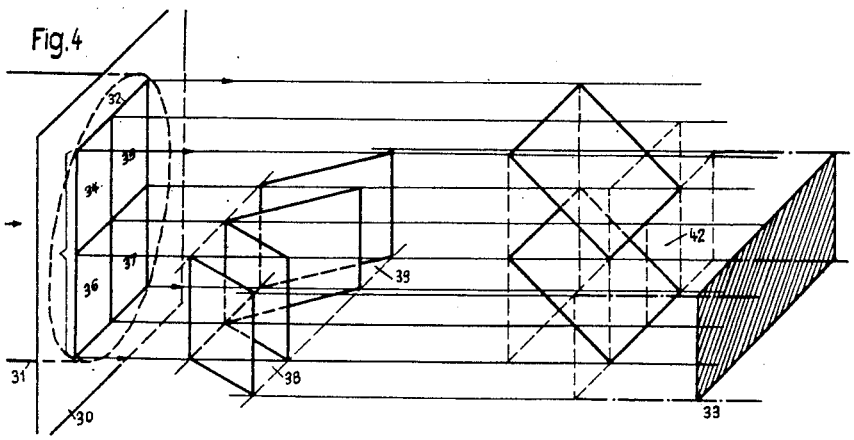
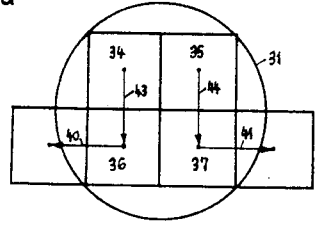
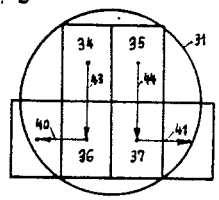
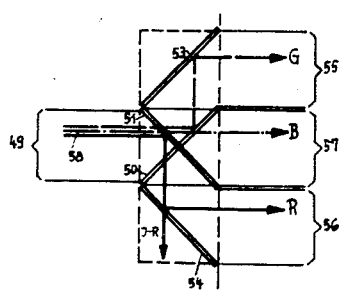
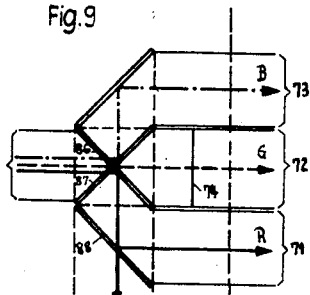
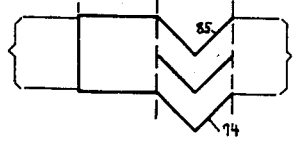
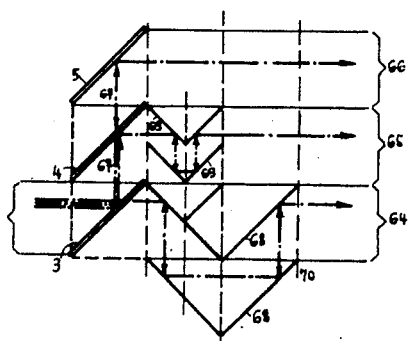
INVENTOR
Edgar Gretener,
BY Pierce, Scheffler & Parke
ATTORNE INVENTOR:
Edgar Gretener, BY Pierce, Scheffler & Parker,
ATTORNEYS Patented July 29, 1952

2,604,813

UNITED STATES PATENT OFFICE 2,604,813

PROJECTION LAMP ILLUMINATION SYSTEM FOR LENTICULATED FILM

Edgar Gretener, Zurich, Switzerland, assignor to Ciba Products Corporation, Kimberton, Pa., a corporation of Pennsylvania Application March 24, 1950, Serial No. 151,642
In Switzerland March 29, 1949

25 Claims. (Cl. 88—24)

This invention relates to illumination systems for colored motion pictures, more particularly to illumination systems for the projection of colored motion pictures by lenticulated film.

Illumination systems for the projection of colored motion pictures by the additive method of color mixture hitherto known, employ absorption color filters in order to produce the required light beams of different color. The absorption filters are inserted in the light path either between the light source, preferably an arc lamp, and the picture window or between the picture window and the projection objective. Such illumination systems do not yield illumination of the projected picture with utmost brightness and efficiency as the use of absorption filters implies high losses of light.

Recently a new type of color filter has become known, producing the filter effect not by absorption, but by discriminately transmitting or reflecting different parts of the light spectrum, thus effecting spectral decomposition of white light. In such "reflexion filters" or dichroic mirrors a preselected part of the light spectrum can be singled out by a partly reflecting surface whereby the filter has the characteristic of transmitting only said part of light spectrum, but reflecting all other parts, or inverse. It is consequently possible by the application of consecutive reflexion filters to decompose white light into several parts of differently colored light which all can be utilized. In case of the projection of colored motion pictures the light will preferably be decomposed into red, green and blue. Such dichroic mirrors or reflexion color filters practically incur no loss of light, as the cause of loss in the customarily employed color filters, viz absorption of the not transmitted parts of the spectrum, is removed. The full exploitation of the advantages offered by reflexion filters in customary projection systems is, however, greatly impaired or even rendered impossible by the optical properties of the customarily used one-sided lenticular film.

Another disadvantage is inherent in hitherto known projection systems for lenticulated color film, as such systems will produce color dominants on the projection screen if the distribution of intensity is not stable all over the light emitting face of the light source. If the intensity of the electric arc is subject to local displacement or temporal variation, which are inevitable with the customarily employed light sources, incorrect reproduction of colors ensues.

The present invention has the object to overcome all such difficulties by eliminating the defects inherent in known forms of projection systems for lenticulated color film and to enhance the projection of such pictures as to the efficiency of illumination and the correctness of color reproduction.

This invention therefore may be described as having the object of raising the efficiency of illumination and reducing the consumption of electrical energy in the light source, inasmuch as the invention avoids the waste of light encountered in the color filters.

Another object of this invention is to enhance the quality of color reproduction by elimination of the harmful influence of temporary or local variation or of a displacement of the electric arc, thus producing colored pictures without color dominants.

Furthermore the invention will increase the brightness of projected pictures, as the invention removes the additional thermal load on the film, caused by infra-red radiation emanating from the light source, thus permitting full exploitation of the thermal capacity of the film by the visible light only.

Still another object of this invention is the full utilization of the light flux emanating from the light source, as the invention provides means for an appropriate adaption of the illumination beam to the aperture of the projection objective.

Figure 8A:
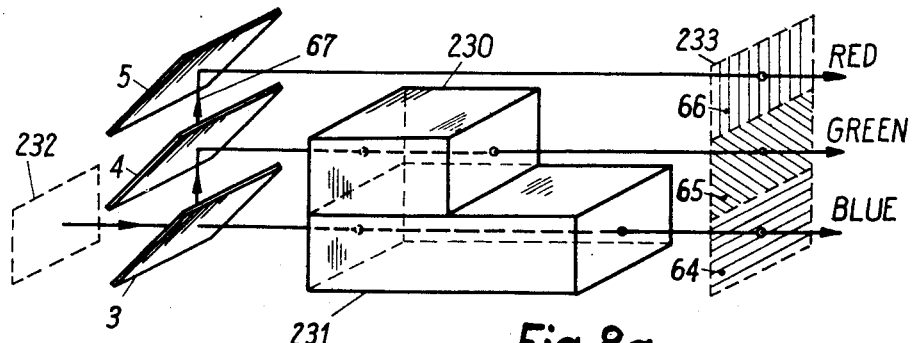
Figure 9B:
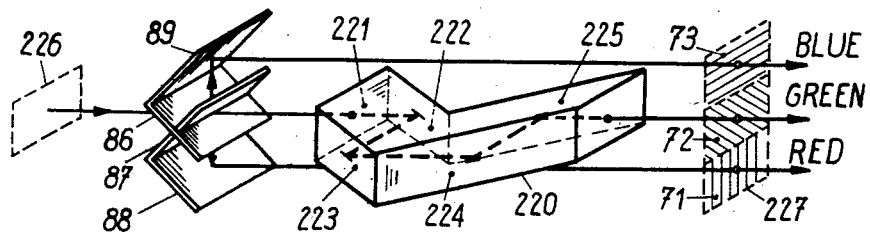

Embodiments of this invention will be described in the following, reference being made to the accompanying drawings, where Fig. 1 illustrates schematically an illumination system with filter set accordingly to the invention, with a parallel arrangement of color filters, Fig. 2 illustrates schematically a similar illumination system with filter set of reduced size, Figs. 3, 3a, 3b and 3c illustrate diagrammatically the form, sectional area and aperture angles of light beams produced by such systems, Figs. 4, 4a and 4b schematically illustrate an additional optical system as set forth by the invention employed to transform the sectional area of light beam before entering the filter set, Fig. 4c schematically illustrates an equivalent optical system employing glass solids of total reflection type in place of parallel mirrors, Fig. 5 schematically illustrates another filter set according to the invention with a parallel arrangement of color filters, Fig. 6 schematically illustrates a different embodiment of the invention with crosswise arranged filters, Fig. 7 schematically shows an illumination system producing a telecentric light beam, Figs. 8 and 8a schematically illustrate filter sets with different types of additional optical means for equalizing the optical path length for the decomposed parts of the light, Figs. 9 and 9a, and Fig. 9b, schematically illustrate, respectively, other embodiments of optical equalizers for a filter set with cross-wise arranged filters, Fig. 10 diagrammatically indicates the required optical characteristics of the reflexion filters of a parallel set, Fig. 11 diagrammatically indicates the required optical characteristics of the reflexion filters of a parallel set with bent axis, In Fig. 1, light emanating from light source 1, preferably the positive crater of an electric arc, is projected by a parabolic mirror 2 into the entrance of a color filter set composed of reflexion filters 3 and 4 and a mirror 5. The light issuing from the filter set is projected onto the picture window 7 by a lens 6, which produces an image of the light source 1 on said picture window. The reflexion filters of the set are preferably arranged to form an angle of 45° with the incident light, as this permits an optically correct separation of the transmitted and of the reflected parts of the light. The reflexion filter 3 may e. g. transmit the red components of the incident white light whereas the green and blue components are reflected upwards at an angle of 90° to the original direction of the beam. This reflected light falls upon a second reflexion filter 4 transmitting blue and reflecting green. The blue light issuing from the filter 4 is deflected by mirror 5 to be again parallel with the original axis of the light beam and with the red and green beam issuing from the filter set. By lens 6 images of the light source are formed from the three beams of different color. The respective images, however, are superposed in the plane of the picture window 7.

By the employment of a parabolic mirror 2, the light beam traversing the filter set is made telecentric. A light beam is spoken of as telecentric if the image of the light source, as here seen from the entrance of the filter, appears as lying at an infinite distance. If additionally the emitting surface of the light source is small in comparison to the focal length of the mirror all light rays of the entire telecentric beam issuing from the reflecting surface of the mirror will be approximately parallel to each other. The insertion of a reflexion filter into a telecentric light beam of practically parallel light is especially advantageous, as the losses produced inside the filter set by eventual mutual shading of the filters are very small. Furthermore the characteristics of transmission and reflexion of a reflexion filter depend upon the direction in which the light falls upon the filter surface. If therefore all incident light rays are practically parallel the intermediate frequency range of the filter between full transmission and full reflexion is very narrow and the efficiency of color separation is very high.

It is evident that reflexion filters permit to obtain a high efficiency of illumination as the light is split into several spectral components that all can be utilized separately. On the contrary, absorption filters suppress the not transmitted parts of the light, which causes a thermal charge of the filter. With reflexion filters an efficiency of illumination may be attained up to 90%, compared with a maximum efficiency of absorption filters of only 20 to 25%. This efficiency of illumination is determined as the ratio of light input of the filter to the total utilizable output of colored light.

This high efficiency of illumination offered by reflexion filters can, however, only be attained with a "lamp-sided" position of the color filter, i. e. if the filter is inserted into the light path between the light source and the picture window. Only then all parts of the decomposed light flux can fully be utilized. If the filter is inserted into such parts where the light has already passed the film and is consequently impregnated with the recording of the color components of the picture, the spectral parts of the light rejected by the reflexion filter in the light beams pertaining to the different colors are worthless, as they are impregnated with the recording, and must be eliminated from the projection light path. Consequently in this "objective-sided" position, reflexion filters offer no advantages over absorption filters.

The advantages of a "lamp-sided" position of the color filter in a projection system for colored motion pictures can however be fully exploited only by the employment of doubly lenticulated film. Such doubly lenticulated film has been described in my U. S. patent application Ser. No. 145,661 of February 23, 1950, and a projection system employing such doubly lenticulated film has been described in my U. S. patent application Ser. No. 145,662 of February 23, 1950. As has been explained in the aforementioned applications only the employment of such doubly lenticulated film will permit to wholly utilize the full amount of light components produced by an illumination system as set forth by this invention.

The employment of reflexion filters presents still another advantage. The partial light beams necessary for the projection of colored motion pictures, preferably beams of red, green and blue, must either provide a uniform and stable intensity of light all over the illumination field or, as the customarily used illumination systems hardly comply with this rigid requirement, all eventual local or temporary variations of the distribution of light intensity must be identical in all three beams. Even the second requirement is not met by the employment of absorption filters, as such filters abstract the partial beams from different parts of the original beam of white light. Such a diverging and heterogeneous distribution of light intensity in the partial beams is caused by a displacement of the light source in respect to the focal point of the light condensing means. The same is valid if the intensity of light varies across the light emanating face of said source. In both cases color dominants on the picture screen ensue.

The employment of reflexion filters ensures an identical distribution of light intensity in the partial beams of different color, as said beams are abstracted from the white beam in an identical way. Forcibly the distribution of light intensity in the partial beams is identical. This may easily be checked by projecting a piece of blank film. If the distribution of light is identical for the red, green and blue component, the screen must show an uniformly white color, whereas relative alterations between the distribution in the colored beams produce color dominants either all over or in partial areas of the screen. A displacement of the light source away from its correct position or other variations causing inhomogeneity of illumination in the white beam, will with reflexion filters produce only a variation of the intensity of white light projected on the screen. If absorption filters are employed, the same variations will produce color dominants.

An arrangement, as shown in Fig. 1 will produce very unhandy dimensions of the filter set and of the condenser lens 6. The dimensions may be reduced by the employment of a light source producing a converging light beam as is represented in Fig. 2. 8 is the light source, 9 a concave mirror. A dispersing lens 10 will produce a telecentric light beam within the filter set 11. 12 is the condenser lens, projecting the image of the light source 8 into the picture windows 13. Though the diameter of the concave mirror 9 is equal to that of mirror 2 shown in Fig. 1, the dimensions of the filter set 11 and of the condenser lens 12 have been substantially reduced.

In order that the aperture of the objective projecting the film images on the screen be fully utilized, the aperture of the illuminating light beam must correspond to the aperture of the projection objective. In Fig. 3 14 is the light source with the concave mirror 15, 16 the reflexion filter set, 17 the condenser lens, projecting an image of the light source into the picture window 18, thus illuminating a piece of film situated in said picture window. The film picture itself is projected onto the screen 20 by the projection objective 19.

The light beam 21 originating from the light source possesses a cross-section area 22 of circular shape. From this circle a square light beam 23 may be cut out without substantial loss of light. If the entrance of the set of color filters 16 likewise has a square form, the light beam 24 issuing from the filter and composed of the three color components will form a cone with rectangular base 25 with a side ratio of 1:3. Such a beam only partly utilizes the aperture of the objective 19 which forms a circular cone. Fig. 3a shows the face of the objective 26 and the cross-section 25 of the light beam. A better utilization of the aperture of the objective would ensue, if the cross-section of the light cone could be made square. This may be realised if the entrance of the filter set 16 is deformed in the inverse sense, as shown in diagram 3b. The ensuing illumination beam 28 shown in Fig. 3c now efficiently utilizes the aperture 26 of the projection objective. If, however, the entrance of the filter set deformed in the above mentioned way is illuminated by the light beam of circular shape 29 shown in Fig. 3b, a considerable loss of light is produced.

Optical means producing a light beam appropriate to the deformed entrance 27 of the color filter without substantial loss of light are diagrammatically shown in Fig. 4. By a diaphragm 30 a telecentric beam 32 of approximately square form is cut out from a circular beam 31 produced by the light source as described above. This light beam 32 with square sectional area is transformed into a beam 33 of rectangular sectional area by the insertion of several sets of parallel mirrors into the light path. The beam 32 is divided into four identical beams 34, 35, 36, 37. The partial beams 36, 37 are displaced in horizontal direction by an amount equal to the side length of their sectional area by two sets of parallel mirrors 38 and 39 displacing beam 36 and 37 respectively. This displacement is indicated schematically by arrows 40 and 41 in Fig. 4a.

The beams 34, 35 are displaced by the same amount in vertical direction by a set of parallel mirrors 42. As indicated by arrows 43 and 44 they fit into the space left free by thelateral displacement of beams 36 and 37. Thus out of the originally square light beam 32 a still telecentric light beam 33 of rectangular sectional area 33 with a side ratio 1:4 is formed. This beam 33 enters the filter set 16. The emerging three beams of colored light are projected into the picture window 18 by lens 17, filling a cone 24 of rectangular sectional area of a side ratio of 3:4. In order to reduce losses in the reflecting surface of the parallel mirrors 38, 39 and 42 glass solids employing total reflection can be used. The entrance surfaces of such prisms may then be coated by the generally known processes to avoid losses caused by reflexion. The aperture angle of the projection objective 19 may be utilized in a still more efficient way, if the cone 24 issuing by lens 7 is given a square sectional area. This is obtained by giving a side ratio of 4:3 to the beam 32 cut out by diaphragm 30. The losses of light, encountered by cutting off parts of the circular beam by diaphragm are practically equal if the sectional area of beam 32 possesses a side ratio of 1:1 (Fig. 4a) or of 4:3 (Fig. 4b).

In Fig. 1 one embodiment of this invention has been described. This embodiment will be spoken of as set of parallel filters. The obtainable number of color components naturally is not limited to three. By an appropriate choice of the transmission and reflexion range of the employed reflexion filters an optional number of beams of different color may be separated.

Fig. 5 shows another form of such a set of parallel filters. Here a telecentric light beam 45, coming from a light source as described above, enters the filter from underneath. The issuing colored beams 46, 47, 48 are at right angles to the entering beam 45. Such a deflection of the light path between the light source and the picture window may be of importance in certain cases.

If the white light is to be split into only three color components another embodiment may be employed as shown in Fig. 6. This embodiment will be spoken of hereinafter as set of crossed filters, as the filter surfaces cross at right angles. The telecentric beam 49 of white light, produced in an analogous arrangement of light source and parabolic mirror as above, falls onto two filters 50 and 51 intersecting at right angles and inclined against the axis of the light beam 49 by an angle of 45°. The filter surface 50 transmits green and blue the red part of the light is deflected upwards by an angle of 90°, whereas by filter 51 the green part is deflected downwards by 90° and the red and blue components are transmitted.

To study the effect of a set of crossed filters as described in Fig. 6 a light ray 58 will be followed. Said ray of white light coming from the light source comprises all color components. The red portion of the spectrum is reflected downwards by filter surface 51 by an angle of 90°, traverses the filter 50 and is again deflected by 90° by mirror 54. It leaves the filter set parallel to the original direction of the light ray 58. The green and blue portions of beam 49 are transmitted by filter 51. By the filter 50 the green portion is reflected upwards and deflected by mirror 53 to be again parallel to the original ray, whereas the blue portion traverses filters 50 and 51, issuing from the filter set parallel to the direction of the original ray.

In order to avoid color dominants, it is necessary, as mentioned above, that the separated light beams though of different color show an identical distribution of light intensity.

This can only be realised, if the optical means producing such three components from the originally white light beam provide equal optical path lengths, as the distribution of light intensity over a cross-section of a telecentric light beam varies with the distance of this section from the mirror. This will be explained by Fig. 7.

A light source 62 is situated in the focal point of a parabolic mirror 60. Thereby a telecentric light beam 63 is produced. The light beam 63 issuing from the reflecting surface of mirror 60 is made up from elementary light cones, e. g. 59', 59'' and 59'''. The distribution of light in any cross-section of the light beam 63 corresponds to the ever increasing overlapping of such light cones as the distance of said section from the mirror 60 increases. Consequently the curves of distribution of light intensity inside a telecentric beam vary with said distance and assume a similar form only at a certain distance from the mirror, i.e. if the diameter of the emanating light beam 63 has grown to be several times greater than the diameter of the parabolic mirror 60.

As the reflexion filter is inserted into the path of the telecentric beam with a distance from the light source amounting only to a fraction of said distance the distribution of light intensity in any section of the beam varies according to the optical path length between said section and the mirror. The sections of separated partial beams of different color therefore show identical distribution of light, if the length of the optical path length between said section and the mirror is equal.

If the optical arrangement of the filter set does not correspond to this requirement, an equalisation of the length of respective optical paths can be effected by the employment of additional optical equalisers. This is shown in Fig. 8 for a set of crossed filters according to Fig. 5. The two light beams, indicated by rays 64 and 65 must be elongated by once or twice the distance 67. This is effected by the insertion of sets of angular mirrors into the light path of rays 64 and 65. The additional path in such angular mirrors is made equal to the necessary elongation of the optical paths. The additional distance of the angular mirrors 68 is equal to the double distance 67, whereas the additional path in the angular mirror 69 is equal to that distance. Consequently both rays 64 and 65 are elongated by an appropriate additional optical path to equal the optical path length of ray 66. The distribution of light intensity of the three light beams in plane 70 is forcibly identical across the whole section of any of such beams, as the distance between said plane and the light source is equal for all three beams.

The same effect can be obtained in a set of crossed reflexion filters according to Fig. 9.

Here, however, only the path length of the middle ray 72 must be elongated, as the paths of the side rays 71 and 73 already are of equal length. A set 74 of angular mirrors is again inserted into the light path of the middle ray 72 as optical equaliser. The plane in which the ray 72 is deflected and redeflected is, however, at right angles to the plane of deflection of the reflexion filter. This is required, if the set of angular mirrors 74 is not to interfere with the light paths of the other rays 71 and 73. Fig. 9 shows a side view and Fig. 9a a bottom view of the selfsame embodiment.

In principle such optical elongation of light beams may also be effected by the insertion of a medium of higher refraction index into the light path. Liquids possessing a very high refraction index are of particular importance. If $n$ be the refraction index of a medium and the proposed elongation be $a$, the necessary path length of the medium along the light path L is determined by:

$$L = \frac{a}{n-1}$$

If e. g. the refraction index be 2, the necessary path length in the medium is equal to the desired elongation $a$. This means that no additional path length or room is required for elongation.

Several points are of importance for the choice of sequence of colors and of the position in the frequency range of transmitting and reflecting areas of the individual filters of one set. Reflexion filters alternating only once between transmission and reflexion in the whole light frequency spectrum may be more easily produced and have higher efficiency than filters alternating several times between transmission and reflexion. Furthermore, filters transmitting radiation of long wavelength and reflecting radiation of short wavelength can be more easily produced than filters with the inverse qualities. Employing terms well known in the art of electrical engineering, a filter transmitting light of long wavelength and reflecting light of short wavelength will be spoken of in the following as "low-pass" filter. In contrary a filter transmitting light of short wavelength and reflecting light of long wavelength as "high-pass" filter. A "band-pass" filter will transmit medium wavelength and reflect long and short waves of light, whereas a "band-rejection" filter has the inverse effect.

On the other hand light sources with a high intensity of light require elimination of the infrared radiation contained in the white light. This requirement can be met by an appropriate choice of the sequence of colors of the filters of the set. Taking into account both points the sequence of color indicated as most advantageous for the described embodiments is indicated in the following.

In order to discern more easily the components of color, separated by the light filter in the drawings referred to hereinafter a full line indicates red light, a dotted line green light, and an intermittent line blue light.

In the set of reflexion filters with straight light path shown in Fig. 10 the infrared radiation is eliminated without additional filters if "high-passes" and "low-passes" are employed. Filter 75 reflects infra-red, red and green, whereas blue is transmitted. Filter 76 reflects green (and blue) and transmits red and infra-red, and filter 77 reflects red (green and blue) and transmits infrared. Filters 76 and 77 are "low-passes" and 75 is a "high-pass". All three filters only have one alternating point between transmission and reflexion all over the whole infrared and visible spectrum.

In a parallel filter set with deflected light path only "low-passes" are required (Fig. 11) and still the infrared radiation may be eliminated. Filter 78 reflects blue and transmits infrared, red and green. Filter 79 reflects green (and blue) and transmits red and infrared, whereas filter 80 reflects red (green and blue) and transmits infrared. As only "low-passes" are required, transmitting long-waved and reflecting short-waved light, this embodiment of a filter offers the least difficulties for production. Two optical equalizers, however, are necessary to obtain light beams of equal optic path length behind the filter set.

In a set of crossed filters the outer beams already comply to the requirement of equal optical length of the light path. An optical equalizer is required only for the middle beam. Often even this optical equalizer may be disposed of. The requirement of identical distribution of light intensity across the whole light beam is more rigid as regards the red and green beams than the blue one. Slight variations of light distribution within the blue beam practically do not impair the quality of reproduction, if only the red and green beams are identical all over the screen. If the green and red components are produced by the outer light paths of the set of crossed filters, both will be optically identical and no optical equalizer will be required for the middle path.

An embodiment of a cross reflexion filter set is shown in Fig. 6. Filter 51 reflects red and infrared and transmits green and blue. Filter 54 reflects red (and green and blue) and transmits infrared. Filter 50 reflects green and transmits infrared, red and blue. Filter 53 reflects green, red and blue and is just an ordinary mirror. Filter 51 consequently is a "high-pass," filter 54 a "low-pass" and filter 50 a "band-rejection-filter." This filter set consequently demands higher expenditures than a set of parallel filters. This, however, may be of minor importance than the advantage offered by symmetrical outer beams.

If an optical equalizer 74 is inserted into the middle beam as shown in Fig. 9 providing three identical beams, the band-rejection filter can be avoided. Filter 86 reflects infrared and red, and transmits green and blue. Filter 87 reflects red (green and blue) and transmits infrared. Filter 88 transmits green, red and infrared and reflects blue. Consequently filter 86 represents a high-pass whereas filter 87 and 88 represents low-passes. This latter arrangement of a crossed filter-set avoids a band-rejection filter.

As has been mentioned above with respect to the optical means shown by Fig. 4, glass solids employing total reflection may also be used in place of the parallel mirrors. This is shown by Fig. 4c, wherein identical parts are given the same reference numerals. The two sets of parallel mirrors 38 and 39 are replaced by glass solids 201 and 202 and the set of mirrors 42 is replaced by glass solid 203. A telecentric beam of parallel light is produced by lens 204 and passes through the square opening of diaphragm 30. The upper half of the beam impinges upon the front surface of solid 203 and is reflected twice inside the solid by total reflection occurring at its surfaces 205 and 206. The lower half of the beam impinges upon the front surfaces of solids 201 and 202 and is displaced towards both sides by total reflection occurring at surfaces 207, 208, 209 and 210 of said solids. The displaced beams issuing from the rear surfaces of the glass solids now form a rectangular beam haivng a section 33. The glass solids 201, 202 and 203 employing total reflection thus produce the same effect as the sets 38, 39 and 42 of parallel mirrors. If the rectangular beam 33 is now made to impinge upon the entrance of a filter set of parallel mirrors, as shown by Fig. 10, and composed of two dichroic mirrors 75 and 76 and deflection mirror 77, the composite beam issuing from this filter set will have a cross section 211, which is approximately square and is capable of being fully utilized by the projection lens. If the transmission characteristics of mirrors 75 and 76 are chosen as has been explained with respect to Fig. 10 a total beam will be composed by three beams of red, green and blue color, the boundaries of which are contiguous at the exit of the filter set.

Glass solids employing total reflection may also be used to replace the sets of angular mirrors used to obtain equal optical path length for the beams of different color. This is shown by Fig. 9b, which shows a set of crossed mirrors equal to that shown by Fig. 9, and wherein equal elements are given the same reference numerals. As has been explained above with a set of crossed mirrors composed of two intersecting dichroic mirrors 86 and 87 and two lateral mirrors 88 and 89, only the center beam must be elongated. In place of the angular mirrors 74 shown in Fig. 9, a glass solid 220 is inserted into the light path of the green center beam. The beam entering through the front surface 221 is successively reflected by surfaces 222, 223, 224 and 225. By a suitable design of the glass solid 220 the additional path length of the light beam inside the glass solid may be made equal to the additional path length of the lateral beams, thereby the optical path length between the section 226 of the original beam of white light and of a section 227 through the composite beam will be equal for all partial beams.

As has been mentioned above, optical elongation of the light beams may also be effected by insertion of a medium of higher refraction index into the light path. This is shown by Fig. 8a which otherwise corresponds to Fig. 8. In the set of parallel mirrors comprising dichroic mirrors 3 and 4 and deflection mirror 5, the center beam 65 must be elongated by once, and the lower beam 64 by twice the optically effective distance 67 between the mirrors. For this purpose a solid 230 is located in the light path of beam 65 and a solid 231 in the light path of beam 64. The path length within these solids must now be chosen in the manner indicated above. The size of the solids shown by way of example in Fig. 8a corresponds to a refraction index of 1.5. As has been mentioned above, also liquids may be employed which provide still higher indices of refraction, and must then be inclosed in a glass receptacle. Thereby likewise the optical path length between a section 232 through the light beam and section 233 through the composite beam may be made equal for all three partial beams 64, 65 and 66.

While I have shown and described particular embodiments of my nvention I however do not wish to be limited thereto but desire the appended claims to be construed as broadly as permissible in the view of prior art. Especially it is to be understood that whilst in the description mention was made only of telecentric beams, it is valid also for non-telecentric beams.

I claim:

1. For use with apparatus for the projection of lenticulated film said apparatus being of the type including a light source and a picture window behind which a lenticulated film may be positioned to be illuminated by said source of light through said picture window, the combination of a color filter set of non-absorptive type comprising a plurality of dichroic mirrors consecutively positioned in the light path from said light source to said picture window, said mirrors having different spectral band reflection-transmission characteristics and developing from incident light from said source geometrically separate beams of different colors of a total light-energy content substantially equal to the light-energy content of said incident light, and auxiliary optical means for directing said separate beams in coincidence upon the said picture window.

2. A filter set for the projection of lenticulated films, and for use with projection apparatus including a source of white light and a projection window behind which a lenticulated film may be positioned; said filter set being of non-absorptive type and comprising a plurality of dichroic mirrors spaced apart and consecutively positioned in the light path from said white light source to said picture window, each of said mirrors extending fully across the said light path and having an active optical surface which reflects one spectral band of the incident light and transmits the remaining spectral bands of the incident light, thereby to develop a plurality of geometrically separate beams of different colors having a total light-energy content substantially equal to the light-energy of said white light source, and optical means for directing the separate beams in coincidence upon said picture window.

3. The combination set forth in claim 2, where the first dichroic mirror nearer to the light source transmits blue light and reflects green and red light, and where a second dichroic mirror farther away from the light source transmits red and reflects green and blue light.

4. The combination as recited in claim 3, in combination with a mirror for reflecting towards said window opening the light beam transmitted by said second reflection filter.

5. The combination as recited in claim 4, wherein said mirror is a dichroic mirror reflecting visible rays and transmitting infra-red rays.

6. In apparatus for the projection of lenticulated film, a light source, a picture window behind which a lenticulated film may be positioned to be illuminated by said source of light through said picture window, a color filter set inserted into the light path between said source of light and said picture window producing light beams of different color required for the projection of pictures recorded on said lenticulated film, and additional optical means inserted into the light path between said source and said picture window causing the light emanating from said source to traverse said filter set and subsequently to converge against said picture window; said filter set comprising two dichroic mirrors with their optically active surfaces approximately parallel to each other and at an angle of 45° to the incident light, and an additional mirror located behind said second dichroic mirror in the direction of the transmitted light and approximately parallel to said active surfaces of the dichroic mirror.

7. The combination set forth in claim 6, where the beam of white light enters the filter set at right angles to the direction of the produced beams of colored light, the first dichroic mirror nearer to the light source transmits green and red light and reflects blue light, and where the second dichroic mirror farther away from the light source transmits red and reflects green and blue light.

8. The combination as recited in claim 7, wherein said additional mirror is a dichroic mirror reflecting visible rays and transmitting infra-red rays.

9. In apparatus for the projection of lenticulated film, a light source, a picture window behind which a lenticulated film may be positioned to be illuminated by said source of light through said picture window, a color filter set inserted into the light path between said source of light and said picture window producing light beams of different color required for the projection of pictures recorded on said lenticulated film, optical means inserted into the light path between said source and said picture window causing the light emanating from said source to traverse said filter set, and additional optical means to converge the beams of different color upon said picture window; said filter set comprising two dichroic mirrors arranged with their optically active surfaces intersecting at an angle of 90° and inclined by an angle of 45° to the direction of the incident light, and two additional mirrors each of which is arranged in the path of light reflected by one of said mirrors and parallel to the active surface of the dichroic mirror from which light is reflected to it whereby the beams of colored light reflected by such mirrors are again made parallel with the beam of white light entering the filter set and with the beams of colored light transmitted by the dichroic mirrors.

10. The combination set forth in claim 9, where one of said dichroic mirrors transmits blue and red light and reflects green light, and where the other dichroic mirror transmits blue and green light and reflects red light.

11. The combination set forth in claim 9, where one of said dichroic mirrors transmits red and green light and reflects blue light, and where the other dichroic mirror transmits blue and green light and reflects red light.

12. The invention as set forth in claim 1, in combination with optical means to produce from said light source a telecentric light beam inside the filter set.

13. The combination set forth in claim 12, and where said optical means comprise a dispersing lens inserted between the light source and the filter set producing a telecentric light beam inside said filter set and said auxiliary optical means comprises a condenser lens inserted between the filter set and the picture window causing the light beams issuing from the filter set to converge against the picture window.

14. The combination set forth in claim 1, where the aperture of the entrance of said filter set is of rectangular shape with a ratio of the sides parallel to the filter zones to the sides at right angles to the filter zones exceeding 1.5:1; and wherein an additional optical means develops from a homogeneous beam of light from said source and of substantially circular cross-section a homogeneous beam of light of the rectangular cross-section of said entrance aperture.

15. The combination set forth in claim 14, where said additional optical means comprise one additional angular mirror system inserted into one part of the light beam between the light source and the filter set, splitting the light pertaining to said part of light beam into two partial beams and displacing each of said partial beams sideways in opposite directions by approximately their breadth, and another additional angular mirror system inserted into the remaining part of the light beam between the light source and the filter set, displaicng the partial light beam pertaining to said remaining part of the light beam as to fit into the space left free by the displacement of the two first named partial light beams.

16. The combination set forth in claim 1, in combination with means including an angular mirror system inserted into the light paths of the colored light beams issuing from the filter set to produce inside the filter equal optical path lengths of all beams.

17. The combination set forth in claim 16, where glass solids employing total reflection are used to constitute said angular mirrors.

18. The combination set forth in claim 1, in combination with means including a material of high refraction index in the light path of a colored beam for equalizing the length of the light paths of all of said separate beams.

19. The combination set forth in claim 1, wherein one of said reflection filters selectively transmits and reflects infra-red and visible rays respectively, whereby the infra-red radiation is eliminated from the path of the projection light beams.

20. The combination set forth in claim 2, wherein one of said reflection filters reflects red, but transmits infra-red light.

21. The combination set forth in claim 6, where said additional mirror reflects red, but transmits infra-red light.

22. The combination set forth in claim 9, where one of said mirrors reflects visible light but transmits infra-red light.

23. In a projection apparatus for lenticular color film and of the type including an illumination source developing a beam of white light of substantially square cross-section, a picture window of rectangular form at which a film may be illuminated by said source, and a filter set between said source and said picture window for directing geometrically separate beams of different color light upon said picture window; an optical system between said illumination source and said filter set including means for splitting a portion of the white light beam to form two partial beams, means for displacing the partial beams in opposite directions from their original positions, and means for displacing another portion of the white light beam into the space left free by the displacement of said partial beams.

24. In a projection apparatus, the invention as recited in claim 23, wherein said means for forming two partial beams develops partial beams of rectangular cross-section.

25. In a projection apparatus, the invention as recited in claim 23, wherein said optical system comprises glass solids of total reflection type.

EDGAR GRETENER.

REFERENCES CITED

The following references are of record in the file of this patent:

UNITED STATES PATENTS

| Number | Name | Date |
|---|---|---|
| 944,787 | Jameaux | Dec. 28, 1909 |
| 973,962 | Oliver | Oct. 25, 1910 |
| 1,163,192 | Adams | Dec. 7, 1915 |
| 1,216,835 | Morris | Feb. 20, 1917 |
| 1,430,494 | Correll | Sept. 26, 1922 |
| 1,599,719 | Roach | Sept. 14, 1926 |
| 1,607,661 | Albert | Nov. 23, 1926 |
| 1,817,026 | Wright | Aug. 4, 1931 |
| 1,986,425 | Ceccarini | Jan. 1, 1935 |
| 1,988,882 | Thomas | Jan. 22, 1935 |
| 2,027,369 | Bourges | Jan. 14, 1936 |
| 2,090,441 | Eggert et al. | Aug. 17, 1937 |
| 2,201,487 | Gretener | May 21, 1940 |

FOREIGN PATENTS

| Number | Country | Date |
|---|---|---|
| 7,179 | Great Britain | of 1904 |
| 206,820 | Great Britain | June 11, 1923 |
| 94,088 | Austria | Aug. 25, 1923 |